(12) United States Patent
Maia et al.

(10) Patent No.: US 10,793,695 B2
(45) Date of Patent: Oct. 6, 2020

(54) THERMOPLASTIC POLYURETHANE GRAPHENE OXIDE NANOCOMPOSITES WITH ENHANCED MECHANICAL BEHAVIOR

(71) Applicant: CASE WESTERN RESERVE UNIVERSITY, Cleveland, OH (US)

(72) Inventors: Joao Maia, Cleveland, OH (US); Tyler Schneider, Cleveland, OH (US); Chaitanya Danda, Cleveland, OH (US); Brandy Grove, Cleveland, OH (US); Shaghayegh Khani, Cleveland, OH (US); Guilhermino Fechine, São Paulo (BR); Ricardo Jorge Espanhol Andrade, São Paulo (BR); Sergio Domingues, São Paulo (BR); Pablo Munoz, São Paulo (BR); Leice Amurin, São Paulo (BR); Danilo Nagaoka, São Paulo (BR)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 0 days.

(21) Appl. No.: 16/170,857

(22) Filed: Oct. 25, 2018

(65) Prior Publication Data

US 2019/0119463 A1 Apr. 25, 2019

Related U.S. Application Data

(60) Provisional application No. 62/576,870, filed on Oct. 25, 2017.

(51) Int. Cl.
| | | |
|---|---|---|
| C08K 3/20 | (2006.01) | |
| C08G 18/72 | (2006.01) | |
| C08G 18/32 | (2006.01) | |
| C08G 18/42 | (2006.01) | |
| C08G 18/66 | (2006.01) | |
| C08J 3/20 | (2006.01) | |
| C08G 18/48 | (2006.01) | |
| C08K 3/04 | (2006.01) | |

(52) U.S. Cl.
CPC ............ *C08K 3/20* (2013.01); *C08G 18/3203* (2013.01); *C08G 18/42* (2013.01); *C08G 18/48* (2013.01); *C08G 18/664* (2013.01); *C08G 18/6674* (2013.01); *C08G 18/6681* (2013.01); *C08G 18/72* (2013.01); *C08J 3/20* (2013.01); *C08J 3/201* (2013.01); *C08K 3/042* (2017.05); *C08J 2375/04* (2013.01); *C08K 2201/011* (2013.01)

(58) Field of Classification Search
CPC ...... C08K 3/20; C08G 18/72; C08G 18/3203; C08G 18/42; C08G 18/664; C08G 18/48; C08J 3/201
USPC ........................................ 524/424
See application file for complete search history.

(56) References Cited

U.S. PATENT DOCUMENTS

| | | | | |
|---|---|---|---|---|
| 5,095,054 A | * | 3/1992 | Lay .................. | A01N 25/10 |
| | | | | 264/328.14 |
| 2003/0181597 A1 | * | 9/2003 | Glogovsky ............ | C08L 23/16 |
| | | | | 525/240 |
| 2018/0044532 A1 | | 2/2018 | Christiansen et al. | |

FOREIGN PATENT DOCUMENTS

| | | |
|---|---|---|
| CN | 106243309 A | 12/2016 |
| CN | 107974071 A | 5/2018 |
| CN | 108059819 A | 5/2018 |
| EP | 2 868 626 A1 | 5/2015 |

OTHER PUBLICATIONS

Strankowski et al (Morphology and the physical and thermal properties . . . graphene oxide, Polish Journal of Chemical Technology, vol. 17, No. 4, 2015, pp. 88-94) (Year: 2015).*

* cited by examiner

*Primary Examiner* — Doris L Lee
(74) *Attorney, Agent, or Firm* — Hudak, Shunk & Farine Co. LPA

(57) ABSTRACT

A polymer nanocomposite composition, wherein nanoparticles, preferably graphene oxide, are well dispersed within a polymer matrix, preferably thermoplastic polyurethane in one embodiment. Affinity of the nanoparticles to one of the phases of the polymer matrix, preferably a hard segment of the thermoplastic polyurethane, provides enhanced mechanical properties. Processes for preparing the polymer nanocomposite compositions are described. In a preferred embodiment, an extensional dispersing element is included within the screw configuration of an extrusion process.

8 Claims, 2 Drawing Sheets

THERMOPLASTIC POLYURETHANE GRAPHENE OXIDE NANOCOMPOSITES WITH ENHANCED MECHANICAL BEHAVIOR

FIELD OF THE INVENTION

The present invention relates to a polymer nanocomposite composition, wherein nanoparticles, preferably graphene oxide, are well dispersed within a polymer matrix, preferably thermoplastic polyurethane in one embodiment. Affinity of the nanoparticles to one of the phases of the polymer matrix, preferably a hard segment of the thermoplastic polyurethane, provides enhanced mechanical properties. Processes for preparing the polymer nanocomposite compositions are described. In a preferred embodiment, an extensional dispersing element is included within the screw configuration of an extrusion process.

BACKGROUND OF THE INVENTION

US Patent Application Publication No. 2018/044532 relates to a method of producing dispersed engineered composite structures using flat flakes of graphene/graphene oxides/reduced graphene oxides in a host as the reinforcing additive of the composite.

European Patent Application EP2868626 relates to a method of manufacturing polyurethane elastomer nanocomposites with the use of oligomerols, oligoesterols and/or oligoetherols, diisocyanates, chain extending or cross-linking agents, amine or organometallic catalysts, and graphene oxide or its reduced form wherein the prepolymer containing 4-20% of free isocyanate groups NCO originated from oligomers in the form of oligoetherols and/or oligoestrols with a molecular weight between 400 and 15 000 g/mol is mixed with 0.01-10 wt. % of nanofiller in the form of graphene oxide, its reduced form, or the nanofiller dispersion prepared in polar or nonpolar solvent, in oligomeric component or in the oligomerol-based mixture containing low-molecular-weight chain extender, or dispersed in isocyanate agent. Next, the mixture is intensively homogenized at a temperature between 10 and 60° C. and the stirring rate up to 10000 rpm for 3 hrs in an ultrasound bath. Polyurethane elastomer nanocomposites obtained according to the aforementioned method are also the object of the invention.

It is well-known that addition of solid fillers to polymer matrices results in increased abrasion resistance and increased brittleness is also observed. A problem to be solved by the present invention was the need for a polymer nanocomposite exhibiting both increased abrasion resistance and a reduction in brittleness.

SUMMARY OF THE INVENTION

In view of the above, a well dispersed polymer nanocomposite composition is described herein. The composition is provided with the aid of an extensional dispersing element within a screw configuration of an extruder during an extrusion process in order to achieve a well dispersed polymer nanocomposite matrix that exhibits increased strength and increased ductility or strain at break.

By providing the composition with a polymer matrix having a combination of soft and hard blocks and different polarities between blocks within its constituent structure, selective dispersion of the nanoparticles is provided therein.

In one embodiment, the composition of the present invention includes a thermoplastic polyurethane as polymer matrix and graphene oxide as nanoparticles. In one embodiment, an important aspect of the present invention provides a thermoplastic polyurethane block copolymer having relatively short hard segments that can form a crystalline structure oriented substantially normal to the surface of a graphene oxide platelet.

In an additional embodiment graphene oxide surface functionalization aids in creating a stronger composition. Exfoliation and/or intercalation can also aid in increasing strength of the composition.

The nanocomposites of the present invention are produced using a solvent-free, continuous method, preferably twin-screw extrusion, wherein pre-polymerized TPU is blended with graphene oxide.

In one aspect a polymer nanocomposite composition is disclosed comprising: a thermoplastic polyurethane block copolymer comprising a plurality of hard segments and a plurality of soft segments; and graphene oxide, present in an amount from about 0.05 wt. % to about 1 wt. % based on the total weight of the thermoplastic polyurethane block copolymer and graphene oxide, wherein the composition exhibits an increase in elongation at break and strain at break as compared to the composition without the graphene oxide.

In a further aspect the composition exhibits an elongation at break of about 200% to about 1,000% percent as measured according to test ASTM D638-14.

In an additional aspect the composition has a tenacity of at least 90 J/mm$^2$ as measured according to test ASTM D638-14 and wherein the tenacity is at least 200% greater than the tenacity of the composition not including the graphene oxide.

In a further aspect the composition has a volume loss of less than 30% as measured according to test ISO 4649.

In an additional aspect a face surface of a platelet of the graphene oxide is oriented substantially normal with respect to the hard segment of the thermoplastic polyurethane.

In a further aspect the graphene oxide is present in an amount from about 0.05 to about 0.5 wt. % based on the total weight of the thermoplastic polyurethane block copolymer.

In an additional aspect the composition has a strain at break that is increased by at least 100%, modulus is increased by up to 50% and stress at break is increased up to 50%, each as measured according to ASTM D638-14, as compared to the composition without the graphene oxide.

In a further aspect the composition has a strain at break that is increased by at least 300%, modulus is increased by up to 100% and stress at break is increased up to 100%, each as measured according to ASTM D638-14, as compared to the composition without the graphene oxide.

In an additional aspect a method for producing the polymer nanocomposite composition is disclosed comprising the steps of: obtaining the thermoplastic polyurethane and graphene oxide; and melt extruding the thermoplastic polyurethane block copolymer and graphene oxide in a twin-screw extruder without the use of a solvent and with use of at least one extensional mixing element to process the composition, wherein the extensional mixing element is static and does not move with the screws.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

The present invention includes a composition comprising a matrix polymer having both hard and soft blocks and different polarities between blocks within its constituent structure and nanoparticles that are dispersed in the polymer matrix thereby forming a polymer nanocomposite.

Various polymers can be utilized as polymer matrix, for example polyurethane. The polyurethane is a thermoplastic polyurethane comprising at least one hard block and at least one soft block and preferably a plurality of hard blocks and soft blocks. The hard blocks generally comprise a diisocyanate component and short chain diols as chain extenders. The soft blocks or segments are generally polyethers or polyesters. In an important aspect of the present invention, the thermoplastic polyurethane has hard segments or blocks having an aspect ratio between chain length and diameter that is below 2:1.

Thermoplastic polyurethanes are commercially available from many different sources. The maximum size of the hard block can vary, due to the degree of functionalization present.

Graphene oxide is present in a composition in an amount from about 0.05 to about 1.0 wt. %, desirably from about 0.05 to about 0.5 wt. % and preferably from about 0.05 to about 0.3 wt. % based on the total weight of the thermoplastic polyurethane and graphene oxide present in the composition.

The graphene oxide can be characterized as having a particular structure after processing, preferably utilizing the extrusion equipment which includes an extensional dispersing element. The graphene oxide has a face with a lateral size that is between 1 and 5 microns. The thickness of the graphene oxide is between 1 and 50 nanometers. The graphene oxide also has a particular crystalline structure that can be characterized as the presence of (002) graphitic planes at 10-12° due to the presence of oxygenated groups.

Various nanoparticles can be utilized in the present invention. In a preferred embodiment graphene oxide is utilized as a nanocomposite.

Figure 1:
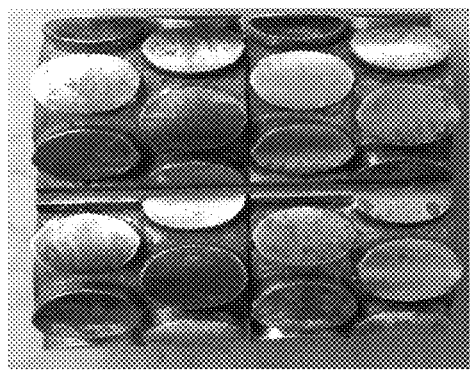
FIG. 1 is one embodiment of an extensional dispersing element employed in the process of the present invention.

The polymer(s) and nanoparticle(s) are combined, along with any other desired additives, either prior to or during processing in an extrusion process, e.g. utilizing an extruder, wherein the graphene oxide is mixed with melted thermoplastic polyurethane at temperatures up to 250° C. The extrusion equipment includes an extensional dispersing element (S4), see for example FIG. 1.

Figure 2:
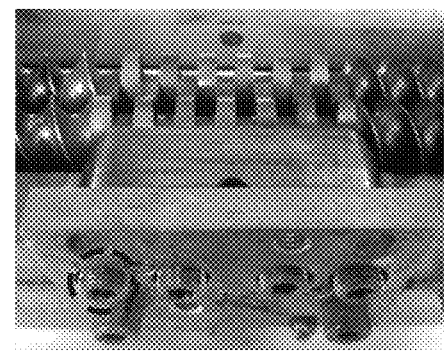
FIG. 2 illustrates one embodiment of a prior art mixing element.
Figure 3:
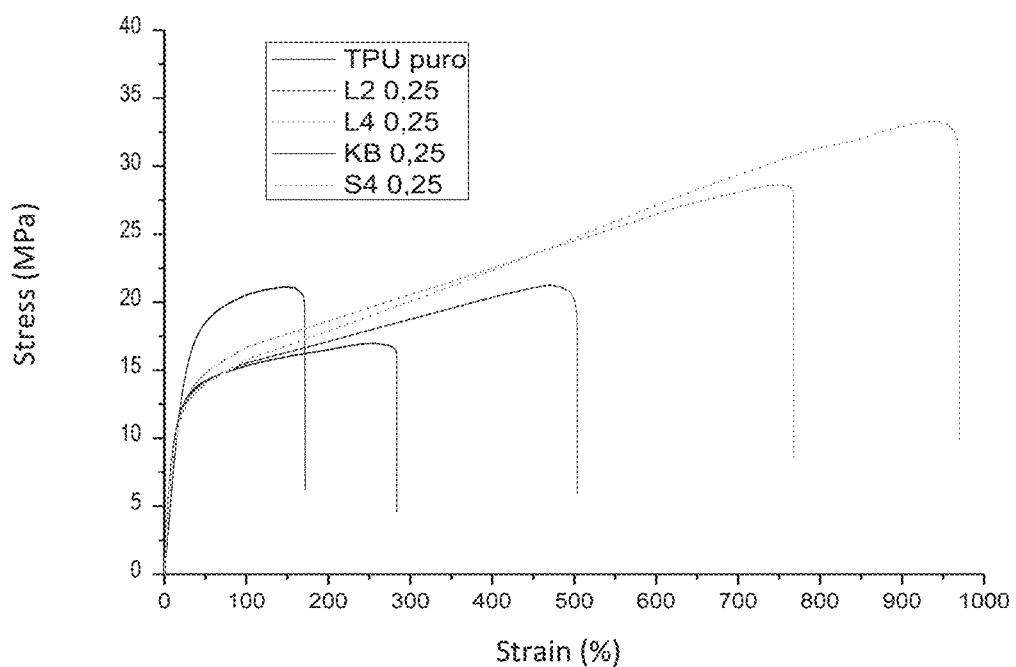
FIG. 3 is a graph including a plot of stress versus strain for various compositions.

Analysis revealed that unexpectedly better dispersion was achieved in comparison with existing, industry standard mixing elements, see for example mixing element (KB) in FIG. 2. Structural characterization studies indicate the presence of the nanoparticles in the crystallizing phase changes the degree of crystallinity and phase separation. Tensile studies revealed that material processed utilizing the extensional dispersion element showed superior ductility of at least 800% strain, desirably at least 900% strain, and preferably at least 950% strain while compositionally equivalent polymer composite processed through standard mixing element KB displays about a 300% strain, see FIG. 3.

Figure 4:
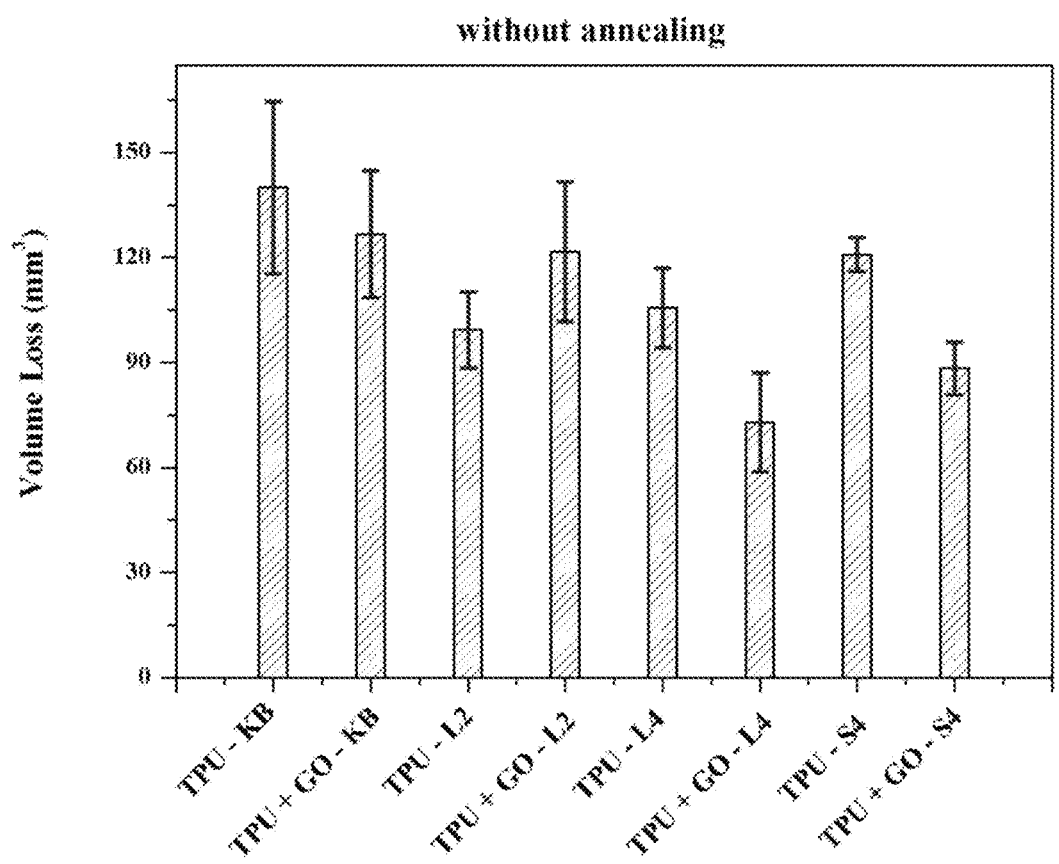
FIG. 4 is a graph illustrating volume loss which is representative of abrasion resistance for various compositions, wherein the far right column illustrates the volume loss for a composition of the present invention.

In additional, abrasion resistance also increased for the compositions of the present invention, in spite of an increase in ductility. Upon exposure to identical abrasion, see FIG. 4, the nanocomposite composition processed through extrusion equipment including extensional dispersing element S4 showed better abrasion resistance with lesser volume loss, about 30% less in comparison to material processed utilizing standard mixing element KB, see FIG. 4.

The processed composition including thermoplastic polyurethane and graphene oxide exhibits interesting structure that is believed to result in the beneficial properties of increased strength and increased ductility or strain at break due to orientation of the graphene oxide in relation to the hard segment or block of the thermoplastic polyurethane. It has been found that the graphene oxide platelets have a substantially normal orientation with respect to a hard block or segment of the thermoplastic polyurethane.

Properties of the composition can be compared to the neat or virgin thermoplastic polyurethane without the graphene oxide, processed according to the present invention. Strain at break is increased by at least by 100%, desirably up to 300% and preferably up to 500% as measured according to test ASTM D638-14. Modulus is at least maintained, desirably increases by up to 50%, and preferably up to 100%, as measured according to test ASTM D638-14. Stress at break is at least maintained, desirably increased up to 50% and preferably up to 100% as measured according to test ASTM D638-14.

Accordingly, the compositions of the present invention offer the combination of increases ductility and increased abrasion resistance and open the door to a development of a whole new generation of highly performing thermoplastic nanocomposites.

For the avoidance of doubt, the compositions of the present invention encompass all possible combinations of the components, including various ranges of said components, disclosed herein. It is further noted that the term "comprising" does not exclude the presence of other elements. However, it is to also be understood that a description of a product or composition comprising certain components also discloses a product consisting of said components. Similarly, it is also to be understood that a description of a process comprising certain steps also discloses a process consisting of the steps.

While in accordance with the patent statutes the best mode and preferred embodiment have been set forth, the scope of the invention is not limited thereto, but rather by the scope of the attached claims.

What is claimed is:

1. A polymer nanocomposite composition, comprising:
   a thermoplastic polyurethane block copolymer comprising a plurality of hard segments and a plurality of soft segments, wherein the hard segments have an aspect ratio between chain length and diameter that is below 2:1; and
   graphene oxide, present in an amount from about 0.05 wt. % to about 1 wt. % based on the total weight of the thermoplastic polyurethane block copolymer and graphene oxide, wherein the graphene oxide has a face surface with a lateral size between 1 and 5 microns and a thickness between 1 and 50 nanometers, wherein a face surface of a platelet of the graphene oxide is oriented substantially normal with respect to the hard segment of the thermoplastic polyurethane, and wherein the composition exhibits an increase in elongation at break and strain at break as compared to the composition without the graphene oxide.

2. The composition according to claim 1, wherein the graphene oxide is present in an amount from about 0.05 to about 0.5 wt. % based on the total weight of the thermoplastic polyurethane block copolymer.

3. The composition according to claim 1, wherein the composition has a strain at break that is increased by at least 100%, modulus is increased by up to 50% and stress at break is increased up to 50%, each as measured according to ASTM D638-14, as compared to the composition without the graphene oxide.

4. The composition according to claim 3, wherein the composition has a strain at break that is increased by at least 300%, modulus is increased by up to 100% and stress at break is increased up to 100%, each as measured according to ASTM D638-14, as compared to the composition without the graphene oxide.

5. The composition according to claim 1, wherein the composition exhibits an elongation at break of about 200% to about 1,000% percent as measured according to test ASTM D638-14.

6. The composition according to claim 5, wherein the composition has a tenacity of at least 90 J/mm$^2$ as measured according to test ASTM D638-14 and wherein the tenacity is at least 200% greater than the tenacity of the composition not including the graphene oxide.

7. The composition according to claim 6, wherein the composition has been processed with an extensional mixing element S4 and in comparison to the composition processed with a mixing element KB has a volume loss of less than 30% as measured according to test ISO 4649.

8. A method for producing the polymer nanocomposite composition according to claim 1, comprising the steps of:
obtaining the thermoplastic polyurethane and graphene oxide; and
melt extruding the thermoplastic polyurethane block copolymer and graphene oxide in a twin-screw extruder without the use of a solvent and with use of at least one extensional mixing element to process the composition, wherein the at least one extensional mixing element is static and does not move with the screws.

* * * * *